US009262241B2

(12) United States Patent (10) Patent No.: US 9,262,241 B2
Giannone et al. (45) Date of Patent: Feb. 16, 2016

(54) COMPUTER SYSTEM, COMPUTER-IMPLEMENTED METHOD AND COMPUTER PROGRAM PRODUCT FOR SEQUENCING INCOMING MESSAGES FOR PROCESSING AT AN APPLICATION

(71) Applicant: ACCENTURE GLOBAL SERVICES LIMITED, Dublin (IE)

(72) Inventors: Vincenzo Giannone, Collegno (IT); Paolo Luongo, Salerno (IT); Raffaele Castagna, Rome (IT); Leopoldo Elefante, Naples (IT)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/298,560

(22) Filed: Jun. 6, 2014

(65) Prior Publication Data

US 2014/0366039 A1 Dec. 11, 2014

(30) Foreign Application Priority Data

Jun. 7, 2013 (EP) .................................. 13 002 943

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)
*G06Q 10/06* (2012.01)

(52) U.S. Cl.
CPC ................ *G06F 9/544* (2013.01); *G06F 9/546* (2013.01); *G06Q 10/06* (2013.01)

(58) Field of Classification Search
None
See application file for complete search history.

(56) References Cited

U.S. PATENT DOCUMENTS

| 2006/0177069 | A1* | 8/2006 | Critchley | H04L 69/16 380/283 |
| 2010/0254259 | A1* | 10/2010 | Singh | G06F 11/1443 370/225 |
| 2010/0254388 | A1 | 10/2010 | Singh et al. | |
| 2010/0257240 | A1* | 10/2010 | Singh | G06F 9/546 709/204 |
| 2010/0257404 | A1* | 10/2010 | Singh | G60F 11/0715 714/19 |
| 2010/0293235 | A1* | 11/2010 | Cadoret | G06F 9/5038 709/206 |
| 2012/0096475 | A1* | 4/2012 | Johnson, III | G06F 9/546 719/314 |
| 2014/0215492 | A1* | 7/2014 | Ross | G06F 9/546 719/314 |

OTHER PUBLICATIONS

European Search Report dated Sep. 27, 2013, issued in EP Application No. 13002943.2, 5 pages.

* cited by examiner

*Primary Examiner* — H S Sough
*Assistant Examiner* — Kimberly Jordan
(74) *Attorney, Agent, or Firm* — Harrity & Harrity, LLP

(57) ABSTRACT

In one aspect, the present application is directed to a computer system, a computer-implemented method and a computer program product for processing at an application. The computer system may comprise an application operable to process incoming messages, wherein at least two of the incoming messages are correlated, wherein correlated messages need processing at the application in a required order; and a sequencing framework implemented with the application to intercept the incoming messages and comprising an internal buffer to identify the correlated messages and to buffer the correlated messages as a message group with the required order, wherein the sequencing framework interacts with the application by transferring the incoming messages from the internal buffer in the required order to the application for processing.

20 Claims, 9 Drawing Sheets

```
<ns:Account_Online>                          <ns:Account_Online>                          <ns:Account_Online>
  <ns:Account>ACC_1234</ns:Account>            <ns:Account>ACC_1234</ns:Account>            <ns:Account>ACC_1234</ns:Account>
  <ns:Alias>Alias</ns:Alias>                   <ns:Alias>Alias</ns:Alias>                   <ns:Alias>Alias</ns:Alias>
  ...                                          ...                                          ...
  <ns:ListOf_Cut_Address_Online>               <ns:ListOf_Cut_Address_Online>               <ns:ListOf_Cut_Address_Online>
    <ns:Cut_Address_Online>                      <ns:Cut_Address_Online>                      <ns:Cut_Address_Online>
      <ns:Id>Id</ns:Id>                            <ns:Id>Id</ns:Id>                            <ns:Id>Id</ns:Id>
      <ns:Type>Type</ns:Type>                      <ns:Type>Type</ns:Type>                      <ns:Type>Type</ns:Type>
      <ns:City>Naples</ns:City>                    <ns:City>Naples</ns:City>                    <ns:City>Naples</ns:City>
      <ns:Country>Italy</ns:Country>               <ns:Country>Italy</ns:Country>               <ns:Country>Italy</ns:Country>
      <ns:PostalCode>80100</ns:PostalCode>         <ns:PostalCode>80100</ns:PostalCode>         <ns:PostalCode>80100</ns:PostalCode>
      <ns:Province>NA</ns:Province>                <ns:Province>NA</ns:Province>                <ns:Province>NA</ns:Province>
      <ns:Street>Porzio</ns:Street>                <ns:Street>Via Porzio</ns:Street>            <ns:Street>Via G.Porzio</ns:Street>
    </ns:Cut_Address_Online>                     </ns:Cut_Address_Online>                     </ns:Cut_Address_Online>
    ...                                          ...                                          ...
  </ns:ListOfCut_Address_Online>               </ns:ListOfCut_Address_Online>               </ns:ListOfCut_Address_Online>
  ...                                          ...                                          ...
</ns:Account_Online>                         </ns:Account_Online>                         </ns:Account_Online>

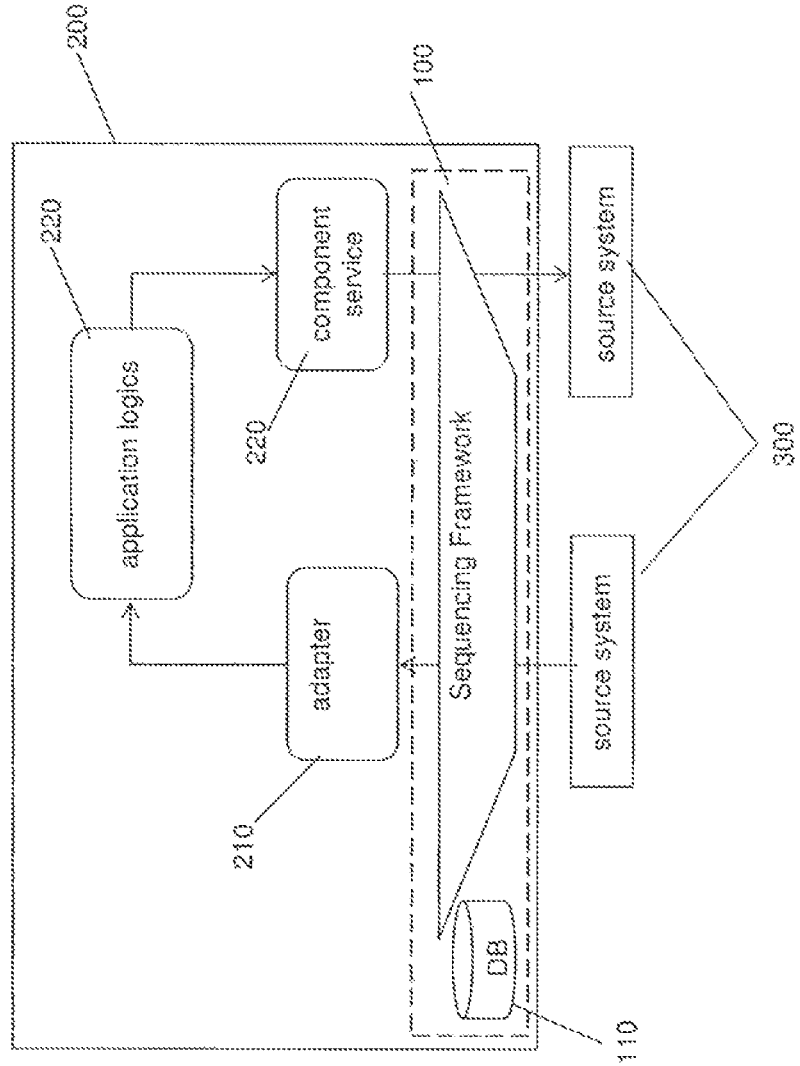

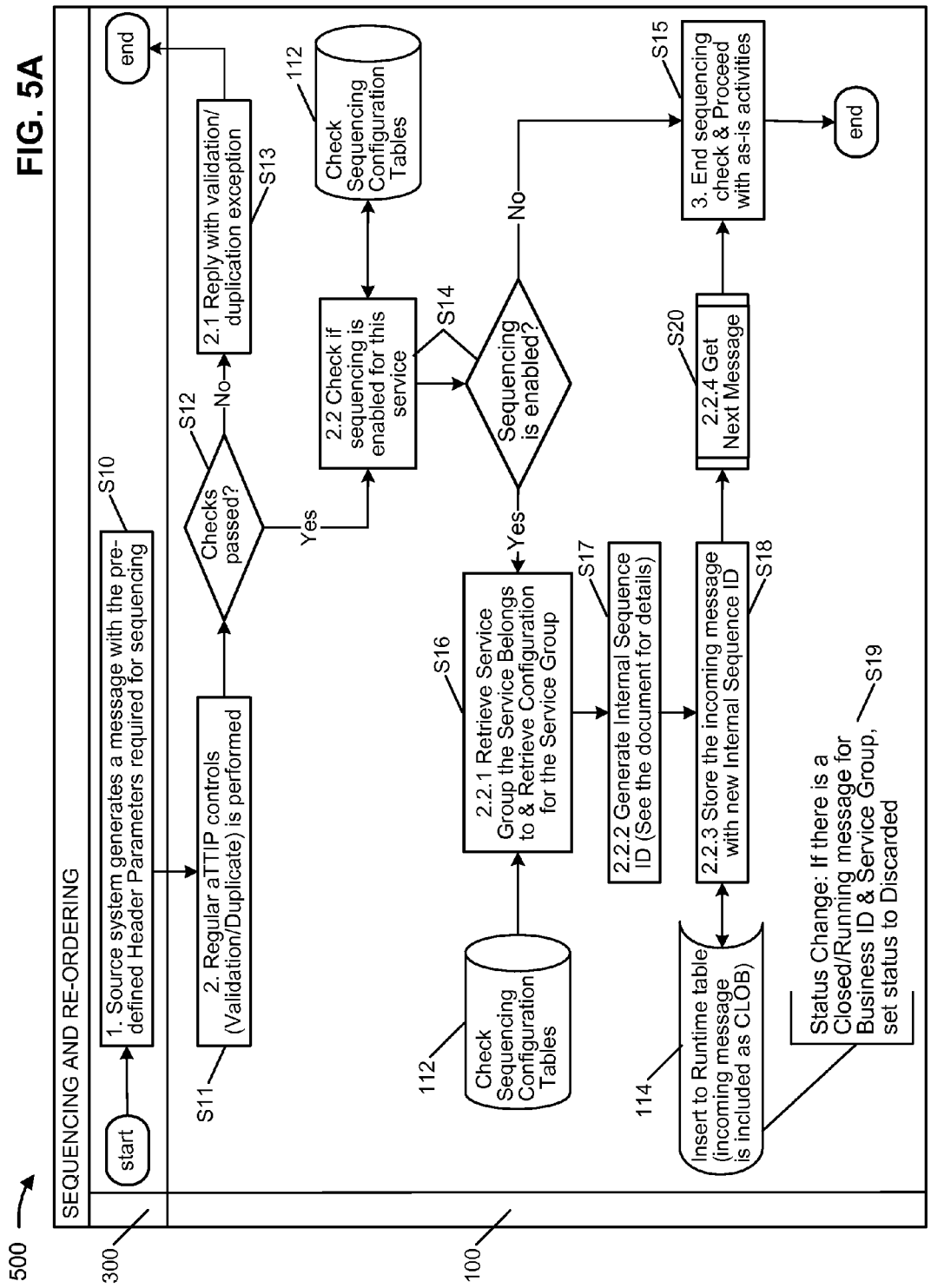

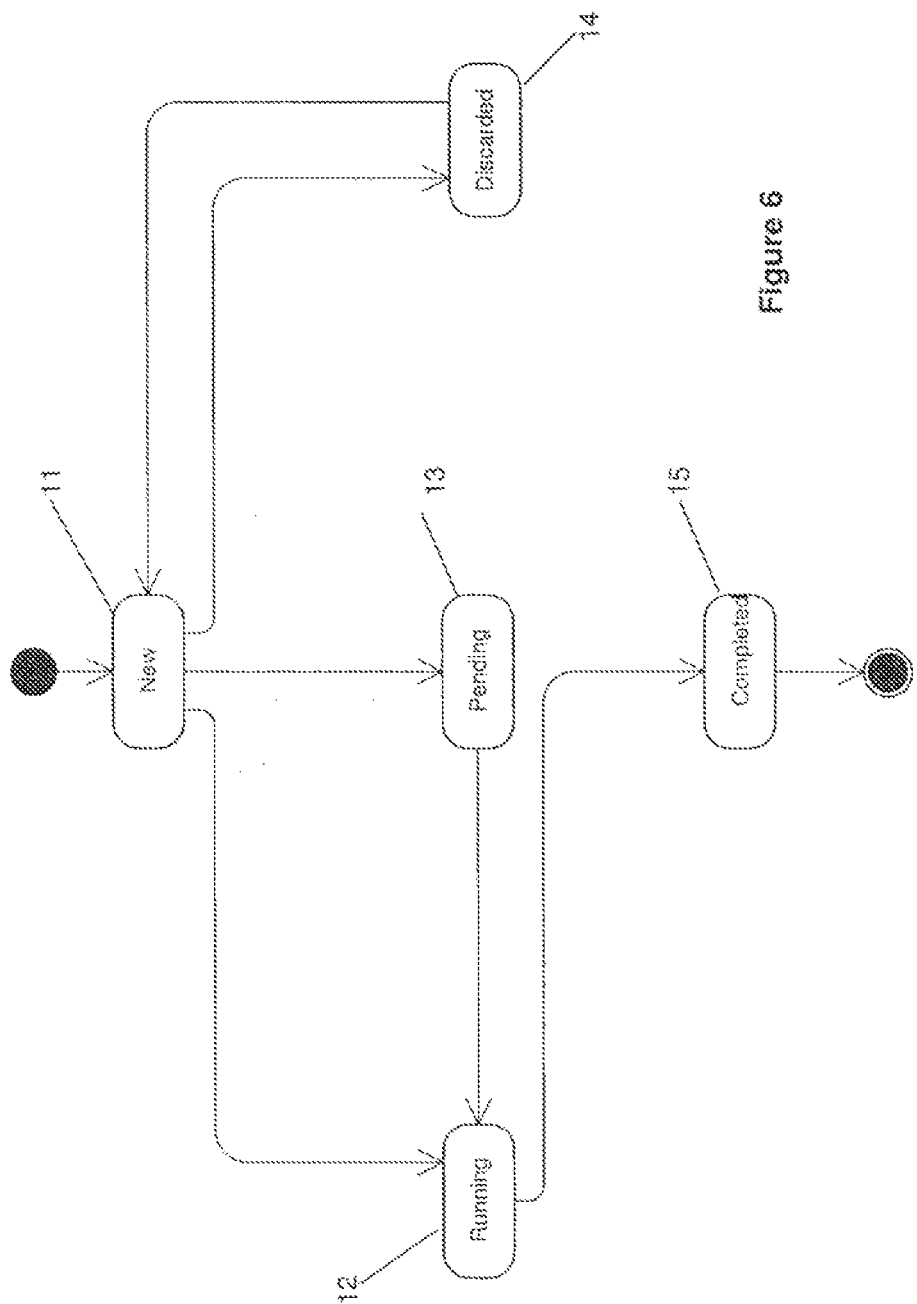

COMPUTER SYSTEM, COMPUTER-IMPLEMENTED METHOD AND COMPUTER PROGRAM PRODUCT FOR SEQUENCING INCOMING MESSAGES FOR PROCESSING AT AN APPLICATION

TECHNICAL FIELD

The description is generally directed to service-oriented architecture (SOA) applications, particularly to message exchange between SOA applications and, in particular, to a system, a computer-implemented method, and a computer program product for sequencing and/or reordering incoming messages to be processed at an application.

BACKGROUND

Many software applications (herein after also referred to as applications) such as SOA-based applications require processing of electronic messages (herein after referred to as messages) in the order in which they were sent to the application over a network from a source system (e.g. a client, another remote software application). Such software applications may be implemented applying the principles of the service-oriented architecture (SOA).

Basically, at present a way to guarantee that messages received at an application are processed in the required order is to have a single thread or process at the receiving application for processing one message at a time. In case of parallel processing, message (re-)ordering and/or sequencing across the parallel processing threads and/or processes of the application can be then no longer guaranteed.

Thus, there is a need to maintain ordering of messages received at a software application for processing without creating a bottleneck in the software application that can process only one message at a given time.

Currently computer systems have been developed that try to address this problem. The available systems, however, have limitations regarding capabilities (e.g. allow sequencing but do not support reordering), protocols (e.g. not support available electronic message communication protocols), and/or portability (e.g. require specific products for installation).

Hence, there is a need to provide systems and methods for addressing the above problems to enable sequencing and/or reordering of incoming messages to maintain ordering of the messages when processed in parallel without creating a bottleneck in the software application that can process only one message at a given time without limitations regarding capabilities, protocols, and/or portability.

SUMMARY OF THE INVENTION

According to one general aspect a computer system for sequencing incoming messages for processing at an application is provided. The computer system may comprise: an application operable to process incoming messages, wherein at least two of the incoming messages are correlated, wherein correlated messages need processing at the application in a required order; and a sequencing framework implemented with the application to intercept the incoming messages and comprising an internal buffer to identify the correlated messages and to buffer the correlated messages as a message group (also referred to as group of messages) with the required order, wherein the sequencing framework interacts with the application by transferring the incoming messages from the internal buffer in the required order to the application for processing.

According to one general aspect, a computer-implemented method for sequencing incoming messages for processing at an application is provided. The method may comprise: receiving incoming messages for processing at an application, wherein at least two of the incoming messages are correlated, wherein correlated messages need processing at the application in a required order; intercepting the incoming messages at a sequencing framework implemented with the application, the sequencing framework comprising an internal buffer to identify the correlated messages and to buffer the correlated messages as a message group (also referred to as group of messages) with the required order; and transferring the incoming messages from the internal buffer of the sequencing framework in the required order to the application for processing.

The incoming messages relate to one or more services provided by the receiving application.

Message groups may be defined by the service and/or the service group the correlated messages belong to. Hence, messages, which are correlated and thus in the same message group relate to the same service and/or the same service group (also referred to as group of services). The sequencing framework defines groups of messages that require ordering when being processed at the application, wherein the messages in the groups themselves can be executed in parallel with other messages belonging to one or more different groups of messages. Messages in one group are said to be correlated messages which require processing at the application in a specific (or required) order.

The buffer can be implemented as a database (e.g. a relational database) comprising one or more database tables. In a database table, each column of the table defines a parameter specified to an entry in the table and a row specifies an entry in the table with values for each of the specified parameters. Said values are also referred to as parameter values.

Implementing an application with the sequencing framework, technically rather complex, extensive, and/or elaborative implementations to define groups of messages which require a sequencing and/or (re-)ordering can be avoided. Rather easy and efficient specification and/or definitions of groups of messages that require ordered processing of the messages in said group while allowing different messages belonging to another group to be processed in parallel by two or more different threads at an application can be enabled.

According to an aspect, the sequencing framework may be implemented as a database-based application with the internal buffer including at least one configuration table and at least one instance table.

According to another aspect, the configuration table may store pre-defined configurations regarding one or more services supported by the application, wherein each service is associated with a service ID and stored with one or more related configuration parameters in the configuration table.

According to yet another aspect, each of the correlate messages may be stored in a row of the instance table with sequencing parameters comprising a message state, a service ID, and/or an internal sequence ID.

The message can be a SOAP message and/or an HTTP request comprising an message header and/or a message body. The message header and/or the message body can comprise parameters relating to the sequencing parameters. For example, the message may comprise a service name and/or the service ID of the service the message belongs to. The message may also comprise a creation date and/or time and/or a sending date and/or time (together also referred to as event data). The internal sequence ID may be also comprised in the message and/or generated from the parameter values retrieved with the message and/or parameter values retrieved from a service configuration of the service the message belongs to as defined in the configuration table. Accordingly, the internal sequence ID can be generated by the sequencing framework and/or by a source system having generated the message and interacting with the sequencing framework.

Preferably, the internal sequence ID is unique to each message stored in an instance table at a given point in time. Preferably, the service ID is unique to each service and/or each service group. The message state specifies the processing state of message with regard to its processing at the application. A message has one of the following associated message states: new, running, pending, discarded, completed.

According to another aspect, correlated messages of the same message group may have the same service ID.

According to another aspect, the internal sequence ID may define the processing order of an incoming message with respect to other correlated messages in the instance table.

According to another aspect, the internal sequence ID may be generated by concatenating one or more configuration parameter values for an incoming message, the configuration parameter values being retrieved from the configuration table based on the associated service ID of the incoming message.

The internal sequence ID preferably is a long number generated by the sequencing framework to ensure the correct sequence of the messages. The internal sequence ID ensures that the messages will be ordered as they should be according to an underlying (processing) configuration for the incoming messages even if the messages are received in a different order. The internal sequence ID may be generated by performing one or more or all of the following steps:

for each received (input) messages, get configuration (retrieve which are the message fields and their order that has to be used for sequencing);

repeat on the configuration fields and for each one get the message's value and transform the message value into a corresponding long number; and generate the internal sequence ID by concatenating all the long numbers.

By generating a sequence ID as described, advantageously, there is no need to maintain a database sequence and/or a configuration to generate internal sequence IDs. Sequence IDs can be generated easily and efficiently using the existing values retrieved from the message and the corresponding service group as stored in the configuration tables to the service ID. Sequencing of messages can be therefore automated. There is no need to re-order a message in the middle of a sequence and shift the sequence ID of the remaining messages. In case a new parameter is added to a configuration of a service group, the added parameter neither affects generation of a sequence ID nor existing sequence IDs.

According to another aspect, the sequencing framework may be implemented with the application as a service-oriented architecture (SOA).

In another general aspect there is provided a computer-program product comprising computer readable instructions, which when loaded and run in a computer system cause the computer system to perform a method as described.

The subject matter described in this specification can be implemented as a method or as a system or using computer program products, tangibly embodied in information carriers, such as a CD-ROM, a DVD-ROM, a semiconductor memory, signal and/or data stream, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various MRI machines.

Details of one or more implementations are set forth in the accompanying exemplary drawings and exemplary description below. Other features will be apparent from the description and drawings, and from the claims.

BRIEF DESCRIPTION OF THE DRAWINGS

FIG. 1 shows exemplary messages received at an application for processing.

FIG. 2 shows exemplary implementation of a sequencing framework in a software application implemented as a SOA (service-oriented architecture).

FIGS. 5A, 5B, and 5C show exemplary message flow of sequencing and/or reordering messages implemented in the sequencing framework.

FIG. 6 shows an exemplary message state flow diagram for a sequencing process implemented in the sequencing framework.

DETAILED DESCRIPTION

Figure 3:
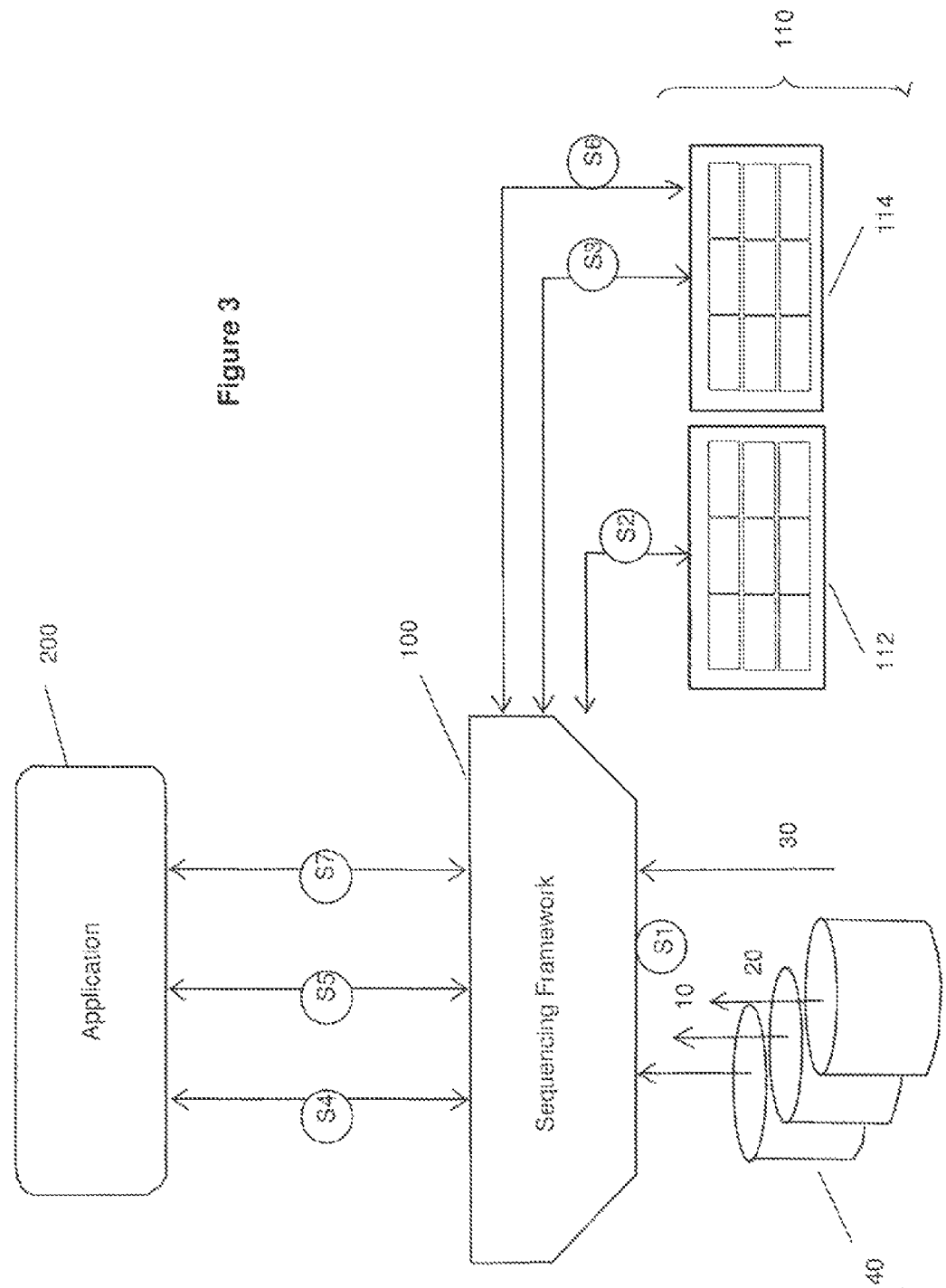
FIG. 3 shows an exemplary message processing at an application using the sequencing framework.

In the following, a detailed description of examples will be given with reference to the drawings. It should be understood that various modifications to the examples may be made. In particular, elements of one example may be combined and used in other examples to form new examples.

FIG. 1 shows exemplary messages 10, 20, 30 which can be sent to a software application (also referred to as application hereinafter) for processing. The messages 10, 20, 30 can be generated at a source system (e.g. a client application, another service application, a server program etc.). The messages 10, 20, 30 relate to one or more services requested from the application which is processing the messages 10, 20, 30 accordingly. The messages 10, 20, 30 sent to the application for processing are also referred to as incoming messages 10, 20, 30. Said application is accordingly also referred to as receiving application.

The messages 10, 20, 30 may be specified in an electronic readable and processable data format such as XML-based data formats as exemplarily shown in FIG. 1. For example, the messages 10, 20, 30 can be HTTP requests, SOAP messages and/or XML-based messages 10, 20, 30 retrieved from a messaging queue such as XML-based JMS queues (Java message service) and/or SOAP-based JMS queues.

For example, a receiving application is processing incoming messages 10, 20, 30. It is assumed that the application requires processing of the received messages 10, 20, 30 in the order in which they were sent to the application over a network (e.g. the Internet).

For example, the application receives three messages 10, 20, 30 as shown in FIG. 1 that have to be processed in the order a (first) message 10 before a (second) message 20 and the (second) message 20 before a (third) message 30. The application can be multithreaded. Multithreaded refers to a functionality of an application comprising more than one thread (also referred to as a process) operable to process incoming messages 10, 20, 30 in parallel. For example the application comprises at least two threads that are operable to process in parallel at least two of the received messages 10, 20, 30. In an exemplary scenario, a first of the threads processes the first message 10 and a second of the threads processes the second message 20. The second thread might finish processing of the second message 20 before the first thread has finished processing of the first message 10. The second thread then might get the third message 30 for processing and also finishes processing of the third message 30 before the first thread has finished processing the first message 10. In this exemplary scenario, the messages 10, 20, 30 are processed with following order: second message 20, third message 30, first message 10. The required order is, however, first message 10, second message 20 followed by third message 30 so that the messages 10, 20, 30 are processed correctly at the application.

Handle message ordering and/or sequencing issues at a receiving application is based on defining groups of messages (messages groups or groups for short, referred to also as sets of messages) that require ordering only within the message group and parallelize the processing by assigning different groups of messages to different threads of the application.

Technically rather complex, extensive, and/or elaborative implementations to define groups of messages which require a sequencing and/or (re-)ordering should be avoided. Rather easy and efficient specification and/or definitions of groups of messages that require ordered processing of the messages in said group while allowing different messages belonging to another group to be processed in parallel by two or more different threads at an application should be enabled. The messages relate to one or more services provided by the receiving application.

The above can be achieved by implementing a sequencing framework 100 with an application processing incoming messages as a service-oriented architecture (SOA) as shown in FIG. 2.

The sequencing framework 100 shown in FIG. 2 can be implemented within a three tier SOA-based application 200 comprising an adapter 210 interfacing inbound messages (also referred to as events) from source systems 300, application logics 220 used for processing the messages and/or component services 230 interfacing outbound messages (also referred to as events) from source systems 300. The application 200 provides services to source systems 300.

The source systems 300 are operable to generate messages regarding one or more services requested from the application 200. The application 200 can interact with the source systems 300 over a network such as the Internet. The sequencing framework 100 interacts with the services 210, 220, 230 of the application 200 in sequencing messages received at the application 200 for processing and provides an interface to one or more source systems 300 for sequencing incoming messages to be processed at the applications 200. An example of a service 210, 220, 230 of the application 200 may include updating a customer data service with a source system 300 propagating customer data to one or more destination systems 400 through the sequencing framework 100. In a first case, the source system 300 sends a message to the sequencing framework 100 for processing without requiring a response from the sequencing framework 100 and/or from the destination system 400. In a second case, the source system 300 sends a message to the sequencing framework 100 for processing and requires a response from the sequencing framework 100 and/ or from the destination system 400. In both cases, the sequencing framework 100 receives a first message and starts processing of the message. While the sequencing framework 100 is performing adapter/application logics/component services 210, 220, 230 steps for the first message, a second message and/or a third message is received at the sequencing framework 100 from the source system 300 that will not be processed but rather set to a pending state since the first message is in running state. When the first message is finished, the first message is set to a completed state and the second message is triggered by starting the adapter/application logic/component service process 210, 220, 230 associated with the sequencing framework 100. After the second message is finished, the second message is set to a completed state and the third message is triggered for processing through the sequencing framework 100 and the related services 210, 220, 230.

The sequencing framework 100 defines groups of messages that require ordering when being processed at the application 200, wherein the messages in the groups themselves can be executed in parallel with other messages belonging to one or more different groups of messages. Messages in one group are said to be correlated messages which require processing in a specific order. The messages can be processed at possibly different threads of the application 200. Defining such groups of messages is achieved by implementing an internal buffer 110 (also referred to as buffer herein) at the sequencing framework 100. The buffer 110 can be implemented as a database comprising one or more database tables.

By implementing the sequencing framework 100 with the buffer 110 in association with an application 200, one or more messages received at the application 200 for processing are intercepted, buffered, and/or stored at the sequencing framework 100 for the receiving application 200 so that the incoming messages are not immediately processed at the application 200. Rather, the incoming messages are intercepted at the sequencing framework 100 and buffered and/or stored in the internal buffer 110 of the sequencing framework 100 before being transferred to the application 200 for processing by one or more threads of the application 200.

The buffer 110 stores a pre-defined configuration for services and/or messages relating to the services. The services are supported by the application 200. The pre-defined configuration comprises a pre-defined set of sequencing and/or reordering rules applicable to incoming messages to be processed at the application. The configuration stored in the buffer 110 can be specified and implemented by an administrator and/or a developer of the application 100.

Basically, incoming messages received at the application 200 are intercepted by the sequencing framework 100 and stored in tables of the buffer 110. In order to process the received messages in a required order, the sequencing framework forwards the received messages to the adapter 210 and/ or application logics 220 of the application 200 for processing. For example, based on the configuration stored in the buffer 110, a next ordered message is transferred to the receiving application 200 for processing. After the message is processed, the sequencing framework 100 in communication with the application 200 having processed the message checks if there exists a correlated message (in the same group of messages) waiting for being processed at the application 200 and if this is the case, it will be provided to the application 200 and processed accordingly.

Advantageously, using the sequencing framework 100, sequencing and/or reordering of messages to be processed at an application 200 becomes fully configurable via the buffer 110 implemented with the sequencing framework 100. The framework provides strictly and non-strictly sequencing features. Non-strictly sequencing is based on the first in first out (FIFO) principle, the framework processes the messages in the order the messages are received at the sequencing framework 100. Strictly sequencing is based on processing received the messages based on a specified order. For example, if the sequencing framework 100 receives three correlated messages, m1, m2 and m3 that comprise a field specifying for each message required positions in the sequence, the framework 100 processes the messages in the required order specified in the corresponding message fields. The sequencing framework 100 is portable. The sequencing framework 100 can be implemented as a database-based application and can be exposed using different technologies.

The sequencing framework 100 can be implemented using a database-based application, wherein an interface to communicate with the database can be implemented using the most common languages like java, C, C++. The sequencing framework 100 is decoupled from an application 200 using the framework 100 in supporting sequencing and/or reordering of messages to be processed at the application 200. This results basically from a SOA-based implementation of the application 200 with the sequencing framework 100. The sequencing can be applied on a specific service and/or a service group based on a service identifier (ID). If it is a group, all the services in the group should have the same service ID. The sequencing framework 100 supports available protocols supported in a SOA (e.g. JMS, FTP, SOAP over HTTP, DB, both synchronous and asynchronous). The sequencing framework 100 supports end-to-end (e.g. between two different applications using the framework) communications (such as via messages) transactions.

FIG. 3 shows an example method for sequencing and/or reordering of messages for processing at an application 200 implemented with the sequencing framework 100.

Sequencing and/or reordering of messages using the sequencing framework 100 basically comprises one or more of the following steps. Receive a message for processing at an application 200 implemented with the sequencing framework 100. The sequencing framework 100 checks whether the message needs to be processed in a specific order with regard to one or more further messages, for example belonging to a specific service requested. Messages which required ordered processing with regard to one or more other messages are supposed to relate to the same group (of messages). For example, messages relating to the same service requested are considered to be correlated in a group. If services are correlated, the services are grouped into groups of services (also referred to as service groups) and the messages belong to any of the services in said service group are grouped. In case an incoming message needs to be processed in a specific order with regard to other correlated messages, this message is buffered at the sequencing framework 100 in the associated buffer 110. Processing of the message is subsequently stopped and/or continued based on pre-defined configuration data as stored in the buffer 110 regarding the other correlated messages. The message is sent to a thread of the application 200 for processing. After the processing is terminated, the sequencing framework 100 is informed and/or notified accordingly. The sequencing framework 100 checks for the correlated messages in the buffer 110 that need to be processed in a specific order with the current message and retrieves the message ordered to be subsequent (also referred to as next message) and provide the next (or subsequent) message to a process of the application 300 for processing.

As shown in FIG. 3, the sequencing framework 100 is implemented with a buffer 110 comprising one or more configuration tables 112 and/or one or more instance tables 114. The configuration tables 112 store pre-defined configurations regarding the services supported by the application 200. The configurations are pre-defined, for example by a developer and/or an administrator having set up and implemented the application 200. The instance tables 114 store incoming messages belonging to one or more services supported by the application 200. For example, messages which belong to a message group (or group of messages) are stored together in one of the instance tables 114 so that each group of messages is stored in a separate instance table 114. Messages in a message group belong to the same service or service group and have the same service ID.

In an example implementation, the below described system and/or method for sequencing and/or reordering messages through the sequencing framework 100 for processing at an application 300 includes one or more of the following steps.

At S1, the sequencing framework 100 intercepts and/or receives an incoming message 10, 20, 30 (e.g. a HTTP request or a SOAP message) for processing at an application 200. Alternatively and/or additionally, the sequencing framework 100 reads and/or retrieves one or more messages 10, 20, 30 for processing at the application 200 from a messaging queue 40 (e.g. a Java message service (JMS) queue such as an XML/JMS queue or a SOAP/JMS queue). The message 10, 20, 30 is specified in a standard data exchange format such as SOAP and/or HTTP and comprises a message header and/or a message body. Data required for sequencing the message can be defined in the message header and/or the message body.

At S2, the sequencing framework 100 extracts a service name from the message 10, 20, 30. The service name may specify a service the message 10, 20, 30 belongs to. The service is supposed to be supported by the receiving application 200. The sequencing framework 100 checks whether the message 10, 20, 30 needs to be sequenced and/or reordered with respect to one or more other messages. The checking can be performed by comparing the extracted service name of the message 10, 20, 30 against corresponding configuration data stored in a configuration table 112 of the buffer 110. For example, it is checked, by accessing with the service name extracted from the message 10, 20, 30 the configuration table 112, whether the service and/or groups of services the message 10, 20, 30 belongs to is defined with required order of processing of correlated messages 10, 20, 30 belonging to the same service and/or same service group.

If at S2 it is determined that the message 10, 20, 30 requires sequenced and/or ordered processing with one or more correlated messages 10, 20, 30 so that the message 10, 20, 30 needs to be ordered in a group of messages with the correlated (or related) messages 10, 20, 30, the sequencing framework 100 stores the message 10, 20, 30 with the correlated messages 10, 20, 30 in an instance table 114, S3. A group of messages stored together in an instance table 114 can be stored in association of an execution plan for said group of messages. The execution plan can be stored within the corresponding instance table 114 of the correlated messages and/or in a configuration table 112 which is linked with the respective instance table 114 of the specific group of messages. For example, the correlated messages 10, 20, 30 can be stored in the order of the execution plan required for said group along with a respective execution state of each message 10, 20, 30, wherein a higher ordered message 10, 20, 30 (e.g. in the first row of the table 114) needs to be completed before a lower ordered messages (e.g. in the second or subsequent row of the table 114) can run. The execution plan can be a pre-defined configuration with regard to a service and/or a group of services the correlated messages 10, 20, 30 belong to and is retrievable for each group from the configuration table 112. The execution plan defines an order and/or a sequence of the correlated message 10, 20, 30 in a group of messages requiring processing at the application 200 in a specific order.

At S4, after a next ordered message 10, 20, 30 is selected for processing at the application, the adapter service 210 of the application 200 is fired. If said current message 10, 20, 30 can be processed by a thread of the application 200, the adapter service launches the application logic 220 of the application 200 for processing. In case the message 10, 20, 30 is rejected, the instance table 114 is updated to block correlated messages 10, 20, 30 in the same group of messages to be processed in a particular order. For example, all correlated messages 10, 20, 30 in the instance table 114 of this group are set to be pending. If the messages 10, 20 and 30 need to be processed in a specific order, when message 10 is running the messages 20 and 30 will be pending waiting for message 10 to be finished (or completed), so that the messages 20, 30 are blocked.

At S5, if the application logic 220 of the application 200 has successfully executed the message 10, 20, 30, the sequencing framework 100 is notified accordingly.

At S6, the sequencing framework 100 updates the state of the group the message 10, 20, 30 being processed belongs to in the instance table 114 of the group. For example, the state of the processed messages 10, 20, 30 in the instance table 114 of the group the message 10, 20, 30 belongs to is set to be completed.

The sequencing framework 100 retrieves a subsequently ordered message 10, 20, 30 (if any) from the same group stored in the same instance table 114 and/or a message 10, 20, 30 from another group of messages which is stored in a different instance table 114, which can be processed in parallel with the set in question, and provides the subsequently retrieved message 10, 20, 30 to the application 200 for processing, S7.

Accordingly, the sequencing framework 100 performs one or more checks at a received message 10, 20, 30. The checking comprises a look up in the configuration table 112 whether the retrieved message 10, 20, 30 requires sequencing with respect to one or more correlated messages 10, 20, 30. Messages 10, 20, 30 may be correlated if they belong to the same service and/or the same group of services. Information regarding the service a message 10, 20, 30 belongs to can be retrieved by extracting the service name communicated with the message 10, 20, 30. Sequencing requirements relating to a service and/or a service group can be looked up in the configuration table or tables 112 of the sequencing framework 100 using the service name. Correlated messages 10, 20, 30 are ordered and/or sequenced in a group of messages (also referred to as message group). A group of messages requires sequential processing in a specific given order while it can be executed in parallel with messages 10, 20, 30 belonging to one or more different groups of messages. Messages 10, 20, 30 belonging to a group of messages are stored together in an instance table 114 of the sequencing framework 100. Each of the messages 10, 20, 30 can be stored in a single row of said table 114 with parameters (also referred to as sequencing parameters) comprising at least a message state, a service ID, and/or an internal sequence ID (also referred to as sequence ID). Messages 10, 20, 30 in one instance table 114 and thus belonging to the same group may have the same service ID.

If a message 10, 20, 30 is synchronous and/or if sequencing is disabled for the message 10, 20, 30, the message 10, 20, 30 is not kept in an instance table 114 of the sequencing framework 100 but rather immediately processed at the application 200.

In case a message 10, 20, 30 is not synchronous and/or sequencing is enabled for the message 10, 20, 30, the message 10, 20, 30 is stored in an instance table 114 of the sequencing framework 100 and ordered in a group with correlated messages to be processed in a specific order. Messages in a group of messages are considered to belong to a specific service or service group and thus have the same service ID. The service ID can be specified in a configuration table 112 of the sequencing framework 100 and can be retrieved from the service name and/or a corresponding ID as retrieved from a received message 10, 20, 30.

In addition to the above described sequencing method, the sequencing framework additionally and/or alternatively implements a strict sequencing on messages 10, 20, 30 for processing at an application 200. Strict sequencing comprises processing of a message 10, 20, 30 only in case the previous (in the required order) message is already received and processed at the application 200. Messages 10, 20, 30 can be stored with an associated sequence ID in an instance table 114 of the sequencing framework 100. The sequence ID is an order number and orders a message 10, 20, 30 with regard to another message 10, 20, 30 in the same group of messages (e.g. having the same service ID) in an instance table 114. For example, when strict sequencing is enabled, a message 10, 20, 30 with sequence ID "4" cannot be processed if another message 10, 20, 30 with sequence ID "3" is not received and processed at the application 200 implemented with the sequencing framework 100.

One or more of the following aspects can be implemented with the sequencing framework 100. For a message 10, 20, 30 sequencing related data can be passed along with the message 10, 20, 30 in a specific section inside of the message header and/or the message body. Said section of the message 10, 20, 30 may be referred to as sequencing section. The sequencing section may comprise a service name, a service ID of the service the message 10, 20, 30 belongs to and/or a sequence ID of the message 10, 20, 30 with respect to its order in the corresponding service. The sequencing section is customizable. For example, it is possible for a user to specify one or more fields of a message, wherein values to the specified message fields need to be passed to the sequencing framework 100 to correctly process the corresponding message.

A service ID and/or a sequence ID of a message 10, 20, 30 may be generated by the sending source system. In case the source system is not able to generate said IDs, the source system sending a message 10, 20, 30 should ensure to send related event data with a consistency between time stamps of different messages. In case more than one source system is operable to send a message 10, 20, 30 for processing having the same service ID, the source systems sending messages having the same service ID are assumed to be synchronized. A source system which is not the master of the data but just working on the data can request not using sequence IDs for messages 10, 20, 30. It is assumed that source systems operate under the same time zone and have synchronized times if the sequencing needs to be managed without a sequence ID. If a group of messages has more than one service inside (e.g. messages with at least two different service IDs), which means inter-service sequencing, the related services in said group of messages should use the same service ID in the header and/or the specific sequencing section of the body of related messages 10, 20, 30 sent. Strict sequencing can be enabled only if the source system is able to provide sequence IDs in the message header and/or the message body of the sent messages 10, 20, 30. If strict sequencing is not enabled, a message 10, 20, 30 with an older sequence ID, which is received by the sequencing framework 100 after a newer message is processed, will be logged and discarded.

Figure 4:
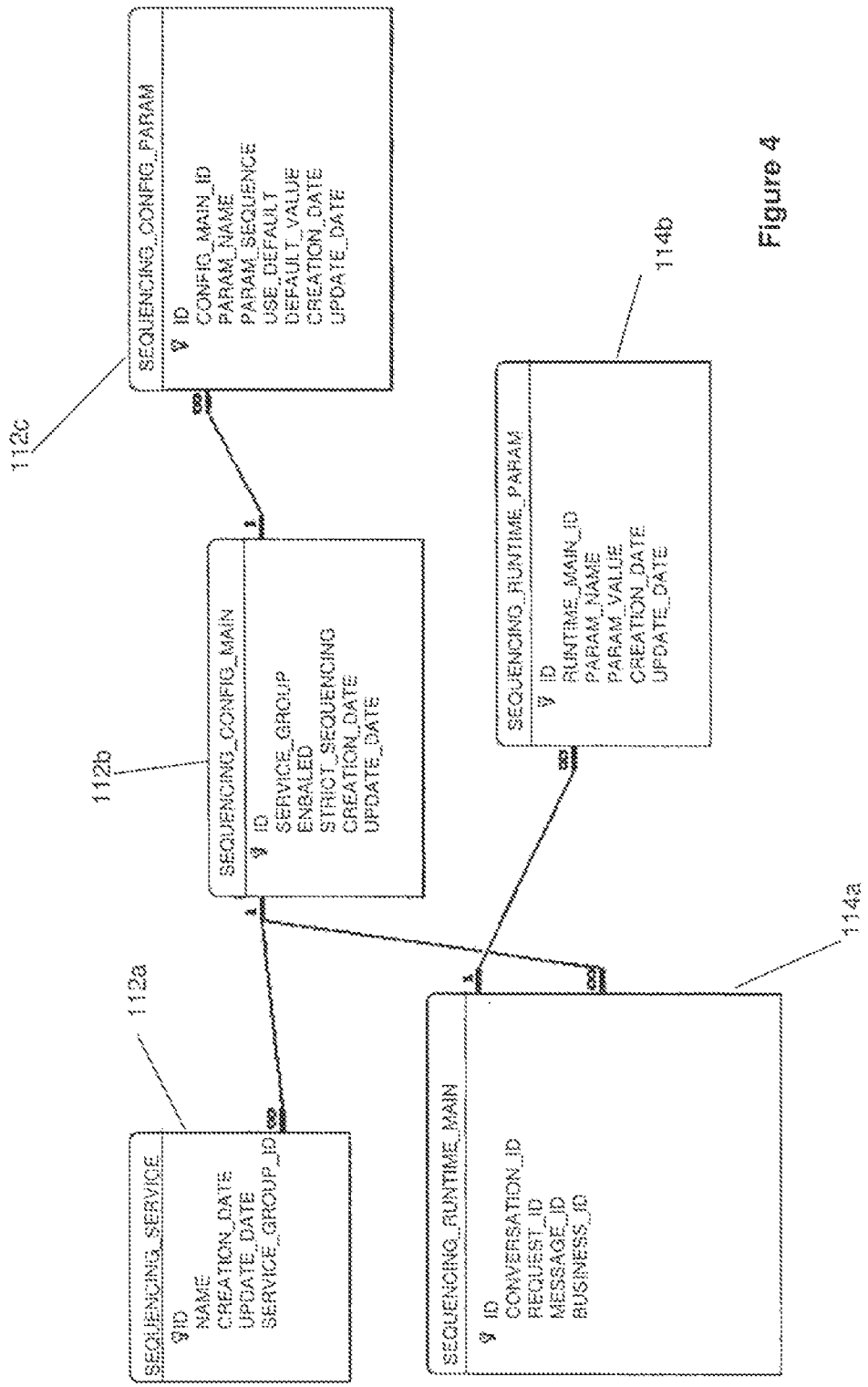
FIG. 4 shows an exemplary data model for implementing the sequencing framework.

FIG. 4 shows exemplary object class specifications usable to implement the sequencing framework 100 as a computer system. Object classes which can be used to implement the sequencing framework 100 comprise one or more configuration table specifications 112 and one or more instance table specifications 114. FIG. 4 shows three exemplary configuration table specifications 112a, 112b, 112c and two exemplary instance table specifications 114a, 114b and their relationships to each other. The table specifications 112, 114 can be implemented as database tables in a buffer 110 (e.g. implemented as a relational database) with the sequencing framework 100.

In the subsequent tables, the first column specifies the parameters an entry in a corresponding configuration table and/or instance table has. The second column in the subsequent tables provides a description of the specification of the corresponding parameter. An entry in a corresponding table implemented according to the below specification is a row of values of the corresponding parameters as specified below.

The SEQUENCING_SERVICE table specification 112a comprises the definition of services available by an application 200. The SEQUENCING_SERVICE table specification 112a is implemented as a configuration table 112. Table 1 below shows exemplary parameters the SEQUENCING_SERVICE table specification 112a can be implemented with.

TABLE 1

| Parameter | Description |
| --- | --- |
| ID | Unique ID of the service definition referred to as service ID |
| NAME | Name of the service |
| SERVICE_GROUP_ID | The service group that the service belongs to |
| CREATION_DATE | The date the row is created |
| UPDATE_DATE | The date the row is last updated |

The SEQUENCING_CONFIG_MAIN table specification 112b provides configurations for the sequencing of incoming messages at an application 200 using the sequencing framework 100. The SEQUENCING_CONFIG_MAIN table specification 112b is operable to store data relating to services supported by the application 200 including service group data, service group level configuration data including enabled/disabled, strict sequencing, etc. The SEQUENCING_CONFIG_MAIN table specification 112b is implemented as a configuration table 112. Table 2 below shows exemplary parameters the SEQUENCING_CONFIG_MAIN table specification 112b can be implemented with.

TABLE 2

| Parameter | Description |
| --- | --- |
| ID | Unique ID of the main configuration definition. It can be considered also as the service group ID |
| SERVICE_GROUP | The name of the service group the configuration is created for |
| ENABLED | A flag that represents whether this configuration is enabled or not |
| STRICT_SEQUENCING | A flag that represents whether strict sequencing for this configuration is enabled or not |
| CREATION_DATE | The date the row is created |
| UPDATE_DATE | The date the row is last updated |

The SEQUENCING_CONFIG_PARAM table specification 112c defines parameters used to generate an internal sequence ID for incoming messages. The SEQUENCING_CONFIG_PARAM table specification 112c is implemented as a configuration table 112. Table 3 below shows exemplary parameters the SEQUENCING_CONFIG_PARAM table specification 112c can be implemented with.

TABLE 3

| Parameter | Description |
| --- | --- |
| ID | Unique ID of the parameter configuration definition |
| CONFIG_MAIN_ID | The ID of the relevant main configuration |
| PARAM_NAME | The name of the parameter to be used to generate the internal sequence id |
| PARAM_SEQUENCE | The sequence of the parameter in the generation of the internal sequence id |
| USE_DEFAULT | A flag that represents whether a default value can be used for this parameter if the value does not come from the system |
| DEFAULT_VALUE | Default value to be used if the USE_DEFAULT flag is true |
| CREATION_DATE | The date the row is created |
| UPDATE_DATE | The date the row is last updated |

The SEQUENCING_RUNTIME_MAIN table specification 114a handles message level runtime data. The SEQUENCING_RUNTIME_MAIN table specification 114a comprises one row for each sequencing-enabled message received at an application 200 implemented with the sequencing framework 100. The SEQUENCING_RUNTIME_MAIN table specification 114a is implemented as an instance stable 114. Table 4 below shows exemplary parameters the SEQUENCING_RUNTIME_MAIN table specification 114a can be implemented with.

TABLE 4

| Parameter | Description |
| --- | --- |
| ID | Unique ID of the main runtime definition. |
| CONVERSATION_ID | Conversation ID from message header kept for tracking purposes |
| REQUEST_ID | Request ID from message header kept for tracking purposes |
| MESSAGE_ID | Message ID from message header kept for tracking purposes |
| BUSINESS_ID | Business ID from message header. One of the core elements of the sequencing |
| SERVICE_GROUP_ID | The service group that the service belongs to |
| TARGET_SERVICE | The service the message will be propagated to. This is important especially for the messages which belong to a service group with more than 1 service |
| STATE | State of the message |

TABLE 4-continued

| Parameter | Description |
| --- | --- |
| INTERNAL_SEQUENCE_ID | The internal sequence ID generated based on the configuration for the service group. This ID is used to decide the right sequence of the messages |
| MESSAGE | The message received from the system maintained as XML |
| CREATION_DATE | The date the row is created |
| UPDATE_DATE | The date the row is last updated |

The SEQUENCING_RUNTIME_PARAM table specification 114b comprises values of parameters used to generate an internal sequence ID for a retrieved message. Each parameter is stored as a row in the corresponding table 114. The SEQUENCING_RUNTIME_PARAM table specification 114b is implemented as an instance table 114. Table 5 below shows exemplary parameters the SEQUENCING_RUNTIME_PARAM table specification 114b can be implemented with.

TABLE 5

| Parameter | Description |
| --- | --- |
| ID | Unique ID for the instance of message parameter |
| RUNTIME_MAIN_ID | The ID of the relevant message in the main runtime table |
| PARAM_NAME | The name of the parameter to be used to generate the internal sequence id |
| PARAM_VALUE | The value of the parameter to be used to generate the internal sequence id |
| CREATION_DATE | The date the row is created |
| UPDATE_DATE | The date the row is last updated |

Figure 5B:
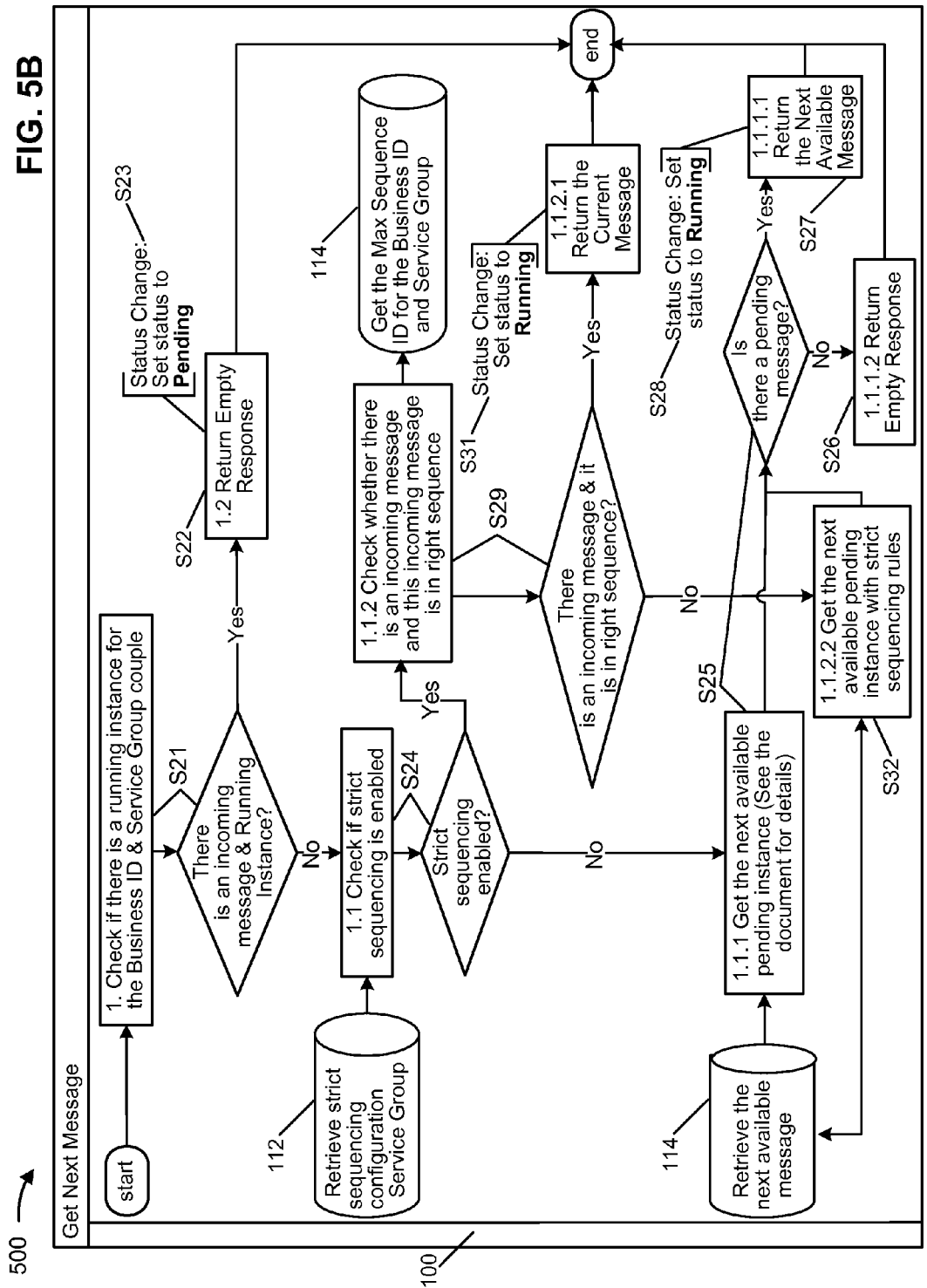
Figure 5C:
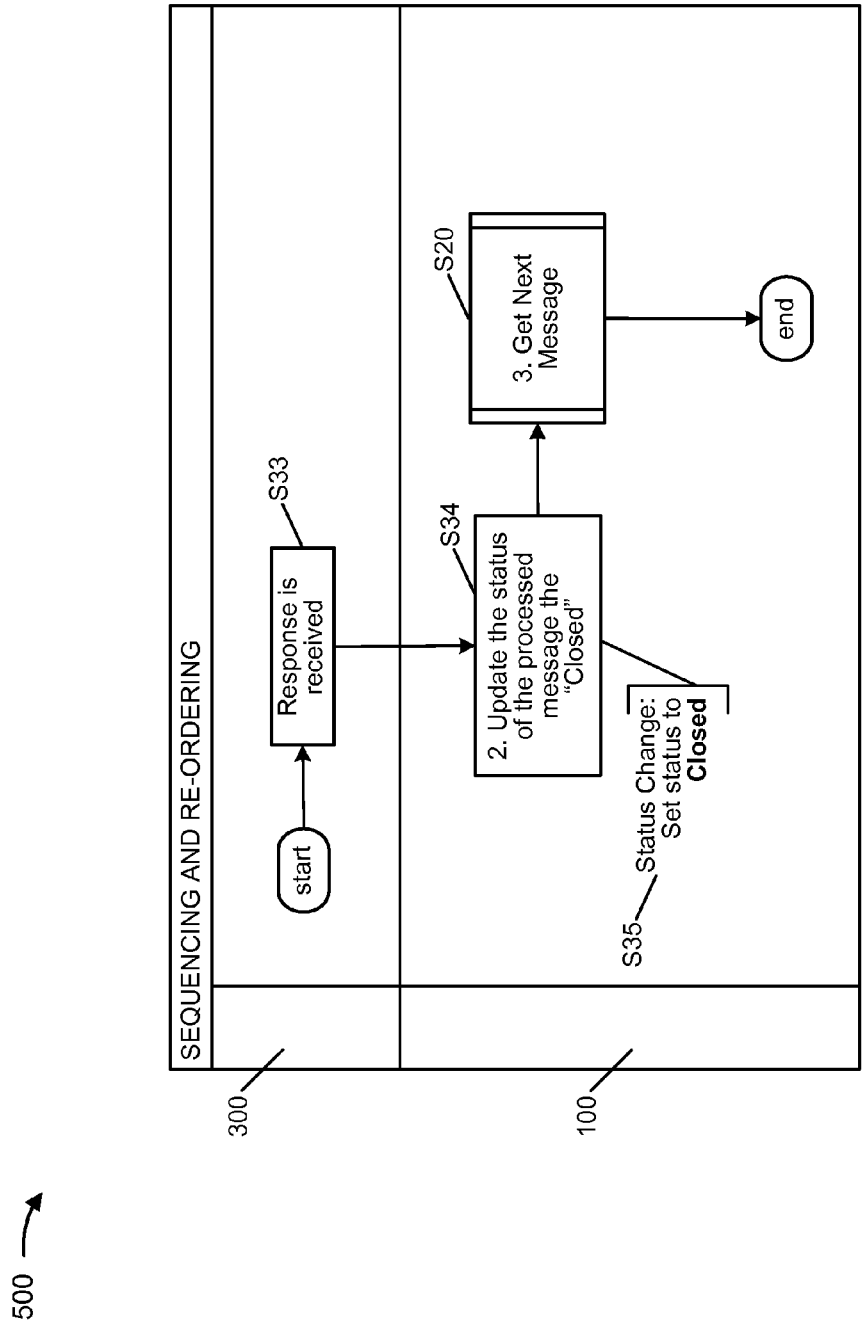

FIGS. 5A to 5C show exemplary flow diagrams which can be implemented in a computer method (e.g. at the sequencing framework 100) to sequence incoming messages for processing at an application 200.

FIG. 5A shows an exemplary flow diagram of a sequencing method implemented in the sequencing framework 100.

At S10, a source system 300 generates a message to be sent to an application 200 for processing. The source system 300 is operable to generate the message with a message header and/or a message body. The message header and/or the message body comprise one or more parameters required by the sequencing framework 100 for sequencing the message accordingly. The parameters (also referred to as sequencing parameters) can comprise a service name of the service the message belongs to, a service ID, an internal sequence ID (also referred to as sequence ID) and/or one or more of the further parameters as specified with reference to FIG. 4 and the corresponding tables 1 to 5. Messages comprise two parts, a message header including generic information about the message such as a service name, a source system, a destination system, one or more business keys, a message type, sequencing information and a message body comprising specific data such as customer data, address information, billing account data. After the message is received at the application 200 being implemented with the sequencing framework 100, regular validation and/or duplication checks are performed on the received message, S11. If the message is not successfully validated, S12, the source system 300 receives an exception notification from the application, S13. Otherwise, the sequencing framework checks whether sequencing is enabled for the received message, S14 by accessing one or more configuration tables implemented with the sequencing framework 100. If sequencing is not enabled for the received message, the sequencing framework 100 immediately passes the message to the services of the application 200 for processing, S15.

If sequencing is enabled for the received message, the sequencing parameters of the message header and/or the message body are used to retrieve, by consulting one or more configuration tables 112 of the sequencing framework 100, the service and/or the service group the message belongs to and/or configuration data for the service group S16. Using the service-related parameters retrieved for the message, an internal sequence ID is generated for the message, S17. Generation of an internal sequence ID (also referred to as sequence ID) is described in greater detail below. The generated internal sequence ID is stored with the message, S20 in an instance table 114 of the sequencing framework 100, S18. Regarding the instance table 114, a corresponding (processing) state is set and/or changed for the message, S19. For example, if the instance table 114 comprises another message having the same service ID and/or service group ID which is currently completed and/or running, the status of the message is set to "discarded". Then, a subsequent message of the same group or set of services is retrieved from the instance table 114 for processing, S20. Retrieving and/or getting a next or subsequent message, S20, is described below with reference to FIG. 5B.

FIG. 5B shows an exemplary flow diagram of a get next message method implemented in the sequencing framework 100. The get next message method can be implemented with the sequencing method shown in FIG. 5A. The get next message method implements retrieval of a next (or subsequently ordered message) for processing if the current message is successfully processed at the application 200.

At S21, a check is performed whether a currently running message (i.e. a message currently processed at the application) having the same service ID and being therefore in the same service and/or service group as an incoming message exists. If this is the case, an empty response is returned, S22. Hence, no subsequent message is retrieved from the instance table 114 with regard to said service ID. The state of the message is set to "pending" in the instance table 114, S23. If no currently running message with the same service ID as the incoming message exists in the instance table 114, a check is performed whether strict sequencing is enabled for the service and/or service group the message belongs to, S24. Corresponding data is retrieved from the configuration table 112.

If strict sequencing is not enabled for the service ID and hence the service and/or service group in question, the next or subsequent to the previously processed message in the instance table 114 with the same service ID which is pending is retrieved from the instance table 114, S25. If no such next message exists, no message is returned, S26. Otherwise, the next message is retrieved from the instance table 114, S27, and its status is set to "running", S28.

If strict sequencing is enabled for the service ID and hence the service and/or service group in question of the currently processed message, a check is performed whether there is an incoming message and whether the incoming message is in the required order regarding the current processing state of the messages having the same service ID, S29. For this check, the corresponding sequence ID of the incoming message is retrieved for said service ID from the instance table 114. If the incoming message is in the correct order, the currently incoming message is returned, S30, and its state is set to "running", S31. Otherwise, the next or subsequent available message having the same service ID is retrieved by accessing the instance table 114, S32. Above steps S25, S26, S27, and/or S28 are according performed.

FIG. 5C shows an exemplary flow diagram of a response method implemented in the sequencing framework 100. The response method can be implemented with the methods described with reference to FIGS. 5A and 5B. At S33, the source system 300 having generated a message for processing at the application 200, receives a response regarding the processing of the message. The response is communicated to the sequencing framework 100 at the application 200 for updating the state of the processed message, S34. The state is accordingly set to "completed", S35. Subsequently, a next and/or subsequent message is retrieved, S20. Retrieval of the next message is described with reference to FIG. 5B.

For each message processed at an application using the sequencing framework, an internal sequence ID is generated for the message. The internal sequence ID can ensure the correct sequence of messages with regard to one or more other messages in the same service and/or service group, i.e. for messages having the same service ID. The sequence ID can ensure that the messages will be ordered as they should be according to the configuration of the corresponding service even if they are received in a different order at the application. The configuration of the corresponding service is pre-defined with the implementation of the corresponding application according to the configuration table specifications described with reference to FIG. 4.

The sequence ID can be generated for a received message. From the name of the service retrieved with the message, the service and/or the service group the message belongs to is identified and specified in terms of a service ID. Messages having the same service ID are supposed to be processed in a specific order and stored together in an instance table with the parameters of the instance table specifications described with reference to FIG. 4. The corresponding configuration parameters defined for the service ID are retrieved from corresponding configuration tables. All the parameter values for the group are identified from the runtime parameters which are created from the message specific values.

For example, assuming the following configuration for update customer data service:

Config param table

| ID | PARAM_NAME | PARAM_SEQUENCE | USE_DEFAULT | DEFAULT_VALUE |
|----|------------|----------------|-------------|---------------|
| 1 | SEQUENCE_ID | 1 | No | — |
| 2 | EVENT_DATE | 2 | No | — |

The sequencing framework 100 receives the following messages M1, M2 and M3:

m1:
```
<message>
    <header>
        <service_name>UpdateCustomerData</service_name>
        <source>System1</source>
        <destination>System2</destination>
        <businessId>123</businessId>
        <requestId>req_2233</requestId>
```

-continued m1:
```
        <sequencing_info>
            <params>
                <param>
                    <name>sequence_id</name>
                    <value>1</value>
                </param>
                <param>
                    <name>event_date</name>
                    <value>130505184801</value>
                </param>
            </params>
        </sequencing_info>
    </header>
    <body>
    ...
    </body>
</message>
``` m2:
```
<message>
    <header>
        <service_name>UpdateCustomerData</service_name>
        <source>System1</source>
        <destination>System2</destination>
        <businessId>123</businessId>
        <requestId>req_2244</requestId>
        <sequencing_info>
            <params>
                <param>
                    <name>sequence_id</name>
                    <value>2</value>
                </param>
                <param>
                    <name>event_date</name>
                    <value>130505184802</value>
                </param>
            </params>
        </sequencing_info>
    </header>
    <body>
    ...
    </body>
</message>
``` m3:
```
<message>
    <header>
        <service_name>UpdateCustomerData</service_name>
        <source>System1</source>
        <destination>System2</destination>
        <businessId>123<businessId>
        <requestId>req_2255</requestId>
        <sequencing_info>
            <params>
                <param>
                    <name>sequence_id</name>
```

-continued

```
                m3:
            <value>3</value>
        </param>
        <param>
            <name>event_date</name>
            <value>130505184803<value>
        </param>
    </params>
    </sequencing_info>
    </header>
    <body>
        ....
    </body>
<message>
```

The sequencing data for processing the messages m1, m2, m3 at the sequencing framework 100 are specified in the <sequencing info> . . . </sequencing info> section of each of the messages m1, m2, m3. When the messages m1, m2, m3 are received and processed at the sequencing framework 100 the following records will be inserted in the runtime param table:

| ID | PARAM_NAME | PARAM_VALUE | RUNTIME_MAIN_ID |
|---|---|---|---|
| 1 | SEQUENCE_ID | 1 | 1 |
| 2 | EVENT_DATE | 130505184801 | 1 |
| 3 | SEQUENCE_ID | 2 | 2 |
| 4 | EVENT_DATE | 130505184802 | 2 |
| 5 | SEQUENCE_ID | 3 | 3 |
| 6 | EVENT_DATE | 130505184803 | 3 |

And will have the following records in the sequencing_runtime_main table:

| ID | INTERNAL_SEQUENCE_ID | STATE |
|---|---|---|
| 1 | 1130505184801 | Running |
| 2 | 2130505184802 | Pending |
| 3 | 3130505184803 | Pending |

In red sequence_id param and in blue event_date param. The internal_sequence_ID is a concatenation following the param sequence order configured in the sequencing_config_param table.

The retrieved configuration parameter values to the service ID are converted to a value of type "long" for the sequence ID field to be stored in the instance table as a parameter value to the entry of the received message. The converted values are concatenated based on the "parameter sequence" in the parameter configuration to create a new "long" value to be used as a sequence ID for the retrieved message. The parameter sequence may be specified in the table sequencing_config_param, and may define the concatenation order of parameters to be followed in order to generate the internal sequence ID for a group of related messages. In the example given above, for sequence_id param sequence 1 and for event_date param sequence 2 in the config param table, when the internal sequence ID is generated for said messages, the concatenation is <sequence_id><event_date>.

By generating a sequence ID as described, advantageously, there is no need to maintain a database sequence and/or a configuration to generate internal sequence IDs. Sequence IDs can be generated easily and efficiently using the existing values retrieved from the message and the corresponding service group as stored in the configuration tables to the service ID. Sequencing of messages can be therefore automated. There is no need to re-order a message in the middle of a sequence and shift the sequence ID of the remaining messages. In case a new parameter is added to a configuration of a service group, the added parameter neither affects generation of a sequence ID nor existing sequence IDs. This might be due to the fact that the newly added parameter is added as the last parameter to the configuration, e.g. the largest PARAM_SEQUENCE value in the SEQUENCING_CONFIG_PARAM table specification 112c shown in FIG. 4.

When strict sequencing is enabled, the configuration for the service group should have only one parameter which is the INTERNAL_SEQUENCE_ID parameter in the SEQUENCING_RUNTIME_MAIN table specification 114a shown in FIG. 4 received from the source system having generated the corresponding message. This enables computation of the maximum INTERNAL_SEQUENCE_ID parameter in the SEQUENCING_RUNTIME_MAIN table specification 114a shown in FIG. 4 in an efficient manner, thereby avoiding additional querying of the SEQUENCING_RUNTIME_PARAM table specification 114b, to maintain another maximum INTERNAL_SEQUENCE_ID column in an instance table 114 and to update said table 114 for all messages with the same service ID when the state of the message is updated to "completed".

Although the sequencing framework 100 can handle sequencing for messages received from source systems being not able to generate sequence IDs, it is preferred that the sequencing framework 100 is implemented with source systems operable to generate sequence IDs for generated messages due to performance aspects. In case the source system does not generate a sequence ID with a message, then to ensure that the sequence is processed using strict sequencing, the corresponding application requires using a single thread to read from the instance table for the corresponding service the message belongs to. This may cause performance issues when the number of incoming messages significantly increases. If an application uses multiple threads, there might be discarded messages because of a possible latency in the thread which is consuming the previous message in the sequence.

With reference to the subsequent tables, two examples are given for the generation of sequence IDs for incoming messages.

The below example relates to the case that the source system is operable to generate a sequence ID for each generated message.

Below is the overview of an implementation of the SEQUENCING_CONFIG_PARAM table specification 112c shown in FIG. 4 for a specific service group:

| ID | PARAM_NAME | PARAM_SEQUENCE | USE_DEFAULT | DEFAULT_VALUE | CREATION_DATE | UPDATE DATE |
|---|---|---|---|---|---|---|
| 1 | SEQUENCE_ID | 1 | No | — | 2013/05/05 | 2013/05/05 |
| 2 | EVENT_DATE | 2 | No | — | 2013/05/05 | 2013/05/05 |
| 3 | SOURCE_SYSTEM | 3 | Yes | 99 | 2013/05/05 | 2013/05/05 |

Below is the overview of an implementation of the SEQUENCING_RUNTIME_PARAM table specification 114b for this example:

| ID | PARAM_NAME | PARAM_VALUE | RUNTIME_MAIN_ID |
|----|------------|-------------|-----------------|
| 1 | SEQUENCE_ID | 1 | 1 |
| 2 | EVENT_DATE | 201102141011124444 | 1 |
| 3 | SOURCE_SYSTEM | 1 | 1 |
| 4 | SEQUENCE_ID | 3 | 2 |
| 5 | EVENT_DATE | 201102141011155555 | 2 |
| 6 | SOURCE_SYSTEM | 1 | 2 |
| 7 | SEQUENCE_ID | 2 | 3 |
| 8 | EVENT_DATE | 201102141011164444 | 3 |
| 9 | SOURCE_SYSTEM | 1 | 3 |

For this example, part of an implementation of the SEQUENCING_RUNTIME_MAIN table specification 114a will be as follows:

| ID | INTERNAL_SEQUENCE_ID | STATE |
|----|----------------------|-------|
| 1 | 12011021410111244441 | Running |
| 2 | 32011021410111555551 | Pending |
| 3 | 22011021410111644441 | Pending |

In this scenario, the message that will be processed will be the one with lower internal sequence ID which is "22011021410111644441", the last row in the table even though its date is later then the other one. The below example relates to the case that the source system is not operable to generate a sequence ID for each generated message.

Below is the overview of an implementation the SEQUENCING_CONFIG_PARAM table specification 112c for a specific service group:

| ID | PARAM_NAME | PARAM_SEQUENCE | USE_DEFAULT | DEFAULT_VALUE |
|----|------------|----------------|-------------|---------------|
| 1 | EVENT_DATE | 1 | No | — |
| 2 | ENTITY_NAME | 2 | Yes | 99 |

Below is the overview of an implementation of the SEQUENCING_RUNTIME_PARAM table specification 114b for this example:

| ID | PARAM_NAME | PARAM_VALUE | RUNTIME_MAIN_ID |
|----|------------|-------------|-----------------|
| 1 | EVENT_DATE | 201102142222224444 | 1 |
| 2 | ENTITY_NAME | 1 | 1 |
| 3 | EVENT_DATE | 201102142222224444 | 2 |
| 4 | ENTITY_NAME | 2 | 2 |
| 5 | EVENT_DATE | 201102142222224488 | 3 |
| 6 | ENTITY_NAME | 2 | 3 |

-continued

| ID | PARAM_NAME | PARAM_VALUE | RUNTIME_MAIN_ID |
|----|------------|-------------|-----------------|
| 7 | EVENT_DATE | 201102142222224499 | 4 |
| 8 | ENTITY_NAME | 1 | 4 |

For this example, part of an implementation of the SEQUENCING_RUNTIME_MAIN table specification 114a will be as follows:

| ID | INTERNAL_SEQUENCE_ID | STATE |
|----|----------------------|-------|
| 1 | 20110214222222244441 | Running |
| 2 | 20110214222222244442 | Pending |
| 3 | 20110214222222244882 | Pending |
| 4 | 20110214222222244991 | Pending |

In this scenario, the first message that will be processed will be the one with internal sequence ID which is "20110214222222244441", as it has "1" at the end even though the messages have the same event date.

FIG. 6 shows possible states 11, 12, 13, 14, 15 a message can be assigned to during the sequencing method implemented with the sequencing framework 100. A message can be assigned to one of the following states 11, 12, 13, 14, 15: "new" 11, "running" 12, "pending" 13, "discarded" 14, completed "15". A state flow for a message in the sequencing method is illustrated. Table 6 below lists and specifies the shown message states 11, 12, 13, 14, 15.

| State | Description |
| --- | --- |
| New | Any message received is initially set to "New" status when they are written to the buffer. Based on the checks performed, the state will be updated to Running, Pending or Discarded. Mainly, this is a temporary state. |
| Running | This state indicates that the message is already in the middle of processing. There might be only one message with Running state for a given service ID and Service Group. |
| Pending | This state indicates that this message is pending as there is another message in Running state which is being processed. When this message will be processed, it will move from Pending to Running. |
| Discarded | This state is used only for service groups where strict sequencing is not enabled. A message goes to this state if a newer message (based on internal sequence id) is already processed. This is one of the final states for a message. |
| Completed | This state indicates that the processing for this message is completed. This is one of the final states for a message. |

Figure 7:
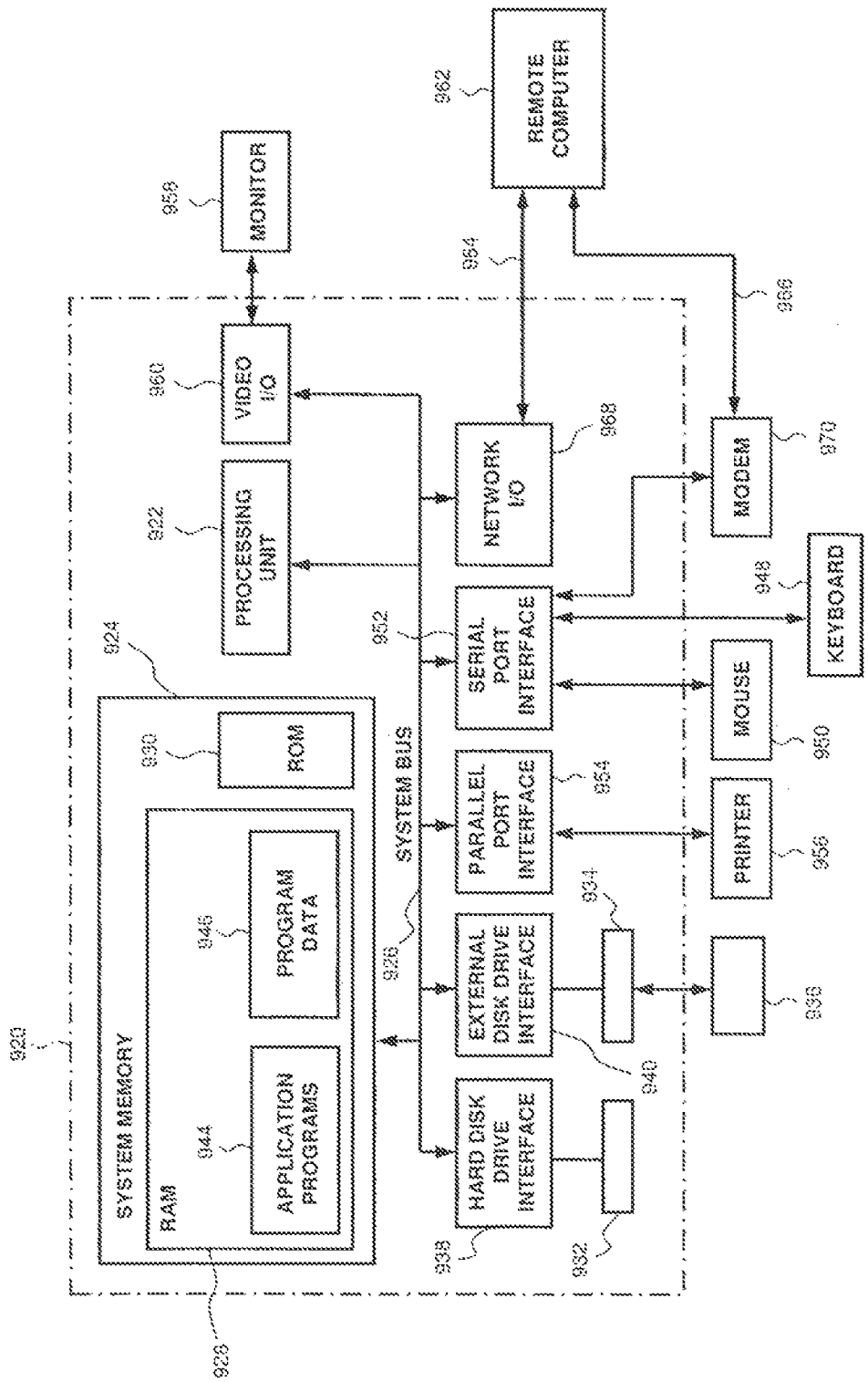
FIG. 7 shows an exemplary computer system and/or computer network system for implementing a computer network, a computer system, and a computer-implemented method as shown in FIGS. 1 to 6.

FIG. 7 shows an exemplary system for implementing the invention including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the personal computer 920. The data structures may include relevant data for the implementation of the method for sequencing incoming messages to be processed at an application, as described above. The relevant data may be organized in a database, for example a relational database management system or an object-oriented database management system.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 6.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956 and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 7 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 7 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method for optimization of evaluation of a policy (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the method for sequencing incoming messages for processing at an application.

REFERENCE SIGNS 10, 20, 30 messages
11 message state "new"
12 message state "running"
13 message state "pending"
14 message state "discarded"
15 message state "completed"
40 messaging queue
100 sequencing framework
110 buffer (e.g. database)
112 configuration table
112a, 112b, 112c configuration table specifications
114 instance table
114a, 114b instance table specifications
200 application
210 adapter
220 application logics
230 component service
300 source system
400 destination system
S1-S35 sequencing steps
920 conventional computing environment
922 processing unit
924 system memory
926 system bus
928 random access memory (RAM)
930 read only memory (ROM)
932 hard disk drive
934 external disk drive
936 removable disk
938 hard disk drive interface
940 external disk drive interface
944 one or more application programs
946 program data
948 keyboard
950 mouse
952 serial port interface
954 parallel port interface
956 printer
958 monitor
960 video input/output
962 remote computer
964 local area network (LAN)
966 wide area network (WAN)
968 network I/O
970 a modem

The invention claimed is:

1. A system comprising:
a memory storing instructions;
a processor configured to execute the instructions to:
receive incoming messages,
at least two of the incoming messages being correlated,
the at least two of the incoming messages to be processed by an application in a particular order;
store the at least two of the incoming messages, in a table, as a message group associated with the particular order,
the table including information identifying a processing order of each incoming message of the at least two of the incoming messages relative to the particular order, information identifying a service associated with the at least two of the incoming messages, and information indicating whether each incoming message of the at least two of the incoming messages is being processed; and
transfer the at least two of the incoming messages from the table, in the particular order, to the application for processing,
the at least two of the incoming messages being transferred based on the information identifying the processing order of each incoming message, the information identifying the service, and the information indicating whether each incoming message is being processed,
when transferring the at least two of the incoming messages, the processor is to:
determine whether an incoming message, associated with the service, is being processed,
determine whether a particular incoming message, of the at least two of the incoming messages, is a next incoming message, in the particular order, to be processed based on the information identifying the processing order when no incoming message, associated with the service, is being processed, and
transfer the particular incoming message to the application for processing when the particular incoming message is the next incoming message to be processed.

2. The system according to claim 1, wherein the at least two of the incoming messages are transferred using a sequencing framework associated with the table, and
wherein the sequencing framework is implemented as a database-based application with a buffer including at least one configuration table and at least one instance table,
the table including the at least one instance table.

3. The system according to claim 2, wherein the at least one configuration table stores pre-defined configurations regarding one or more services supported by the application, and
wherein each service is associated with a service ID and is stored with one or more related configuration parameters in the at least one configuration table.

4. The system according to claim 2, wherein each of the at least two of the incoming messages is stored in a row of the at least one instance table with sequencing parameters,
the sequencing parameters comprising at least one of a message state, a service ID, or an internal sequence ID,
the information identifying the service including the service ID,
the information identifying the processing order of each incoming message including the internal sequence ID, and
the information indicating whether each incoming message is being processed including the message state.

5. The system according to claim 4, wherein the at least two of the incoming messages have a same service ID.

6. The system according to claim 4, wherein the internal sequence ID of an incoming message, of the at least two of the incoming messages, is generated based on a sequence identifier included in the incoming message.

7. The system according to claim 4, wherein the internal sequence ID, of an incoming message of the at least two of the incoming messages, is generated by concatenating one or more configuration parameter values for the incoming message,
the one or more configuration parameter values being retrieved from the at least one configuration table based on the service ID of the incoming message.

8. The system according to claim 1, wherein the at least two of the incoming messages are transferred using a sequencing framework, and
wherein the sequencing framework is implemented with the application as a service-oriented architecture (SOA).

9. A method comprising:
receiving, by a computer, incoming messages for processing by an application,
the incoming messages being correlated,
the incoming messages being associated with a service,
the incoming messages to be processed by the application in a particular order;
storing, by the computer, the incoming messages as a group of messages associated with the particular order and in a table,
the table including information identifying a processing order of each incoming message of the incoming messages relative to the particular order and information indicating whether each incoming message of the incoming messages is being processed; and
transferring, by the computer, the incoming messages from the table, in the particular order, to the application for processing,
the incoming messages being transferred based on the information identifying the processing order of each incoming message and the information indicating whether each incoming message is being processed,
transferring the incoming messages including:
determining whether an incoming message, associated with the service, is being processed,
determining, based on the information identifying the processing order, whether a particular incoming message, of the incoming messages, is a next incoming message, in the particular order, to processed when no incoming message, associated with the service, is being processed, and
transferring the particular incoming message to the application for processing when the particular incoming message is the next incoming message to be processed.

10. The method according to claim 9, wherein the incoming messages are transferred using a sequencing framework associated with the table, and
wherein the sequencing framework is implemented as a database-based application with a buffer including at least one configuration table and at least one instance table,
the table including the at least one instance table.

11. The method according to claim 10, wherein the at least one configuration table stores pre-defined configurations regarding one or more services supported by the application, and
wherein each service is associated with a service ID and is stored with one or more related configuration parameters in the at least one configuration table.

12. The method according to claim 10, wherein each of the incoming messages is stored, in a row of the at least one instance table, with sequencing parameters,
the sequencing parameters comprising at least one of a message state, a service ID, or an internal sequence ID,
the information identifying the processing order of each incoming message including the internal sequence ID, and
the information indicating whether each incoming message is being processed including the message state.

13. The method according to claim 12, wherein the internal sequence ID, of an incoming message of the incoming messages, is generated based on a sequence identifier included in the incoming message.

14. The method according to claim 12, wherein the internal sequence ID, of an incoming message of the incoming messages, is generated by concatenating one or more configuration parameter values for the incoming message,
the one or more configuration parameter values being retrieved from the at least one configuration table based on the service ID of the incoming message.

15. A non-transitory computer-readable medium storing instructions, the instructions comprising:
one or more instructions that, when executed by a computer, cause the computer to:
receive incoming messages for processing by an application,
at least two of the incoming messages being correlated,
the at least two of the incoming messages being associated with a service,
the at least two of the incoming messages to be processed by the application in a particular order;
store the at least two of the incoming messages, in a table, as a group of messages associated with the particular order,
the table including information identifying a processing order of each incoming message relative to the particular order and information indicating whether each incoming message is being processed; and
transfer the at least two of the incoming messages from the table, in the particular order, to the application for processing,
the at least two of the incoming messages being transferred based on the information identifying the processing order of each incoming message and the information indicating whether each incoming message is being processed,
the one or more instructions to transfer the at least two of the incoming messages including one or more instructions to:
determine whether an incoming message, associated with the service, is being processed,
determine, based on the information identifying the processing order and when no incoming message associated with the service is being processed, whether a particular incoming message, of the at least two of the incoming messages, is a next incoming message, in the particular order, to processed, and
transfer the particular incoming message to the application for processing when the particular incoming message is the next incoming message to be processed.

16. The non-transitory computer-readable medium of claim 15, wherein the at least two of the incoming messages are transferred using a sequencing framework associated with the table, and
wherein the sequencing framework is implemented as a database-based application with a buffer including at least one configuration table and at least one instance table,
the table including the at least one instance table.

17. The non-transitory computer-readable medium of claim 16, wherein the at least one configuration table stores pre-defined configurations regarding one or more services supported by the application, and
wherein each service is associated with a service ID and is stored with one or more related configuration parameters in the at least one configuration table.

18. The non-transitory computer-readable medium of claim 16, wherein each of the at least two of the incoming messages is stored, in a row of the at least one instance table, with sequencing parameters,
- the sequencing parameters comprising at least one of a message state, a service ID, or an internal sequence ID,
  - the information identifying the processing order of each incoming message including the internal sequence ID, and
  - the information indicating whether each incoming message is being processed including the message state.

19. The non-transitory computer-readable medium of claim 18, wherein the at least two of the incoming messages have a same service ID.

20. The non-transitory computer-readable medium of claim 15, wherein the information identifying the processing order, of an incoming message of the at least two of the incoming messages, is generated based on a sequence identifier included in the incoming message.

\* \* \* \* \*